US009451842B2

United States Patent
Melton et al.

(10) Patent No.: US 9,451,842 B2
(45) Date of Patent: *Sep. 27, 2016

(54) INSULATED DOUBLE WALLED DRINKING VESSEL AND METHOD OF MAKING THE SAME

(71) Applicant: Tervis Tumbler Company, North Venice, FL (US)

(72) Inventors: Thomas Melton, Englewood, FL (US); Thomas Fulton, Sarasota, FL (US)

(73) Assignee: Tervis Tumbler Company, North Venice, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,907

(22) Filed: Apr. 27, 2015

(65) Prior Publication Data

US 2015/0342381 A1    Dec. 3, 2015

Related U.S. Application Data

(63) Continuation-in-part of application No. 14/694,363, filed on Apr. 23, 2015.

(60) Provisional application No. 61/987,147, filed on May 1, 2014.

(51) Int. Cl.
*A47G 19/22*       (2006.01)
*B29C 45/00*       (2006.01)
(Continued)

(52) U.S. Cl.
CPC ....... *A47G 19/2288* (2013.01); *A47G 19/2205* (2013.01); *B29C 45/006* (2013.01); *B29C 65/08* (2013.01); *B29C 66/12445* (2013.01);
(Continued)

(58) Field of Classification Search
CPC ............ A47J 19/2205; A47J 19/2288; A47G 19/2205; A47G 19/2288; A47G 2400/10; A47G 19/22; A47G 19/2227
USPC .............. 220/592.16, 592.17, 612, 659, 656, 220/592.2; 264/248
See application file for complete search history.

(56) References Cited

U.S. PATENT DOCUMENTS 3,247,302 A * 4/1966 Lewis ................. A47J 41/0077
                                                    215/12.1
3,827,925 A   8/1974 Douglas
(Continued)

OTHER PUBLICATIONS

International Search Report of PCT Application No. PCT/US2015/027890, dated Jul. 30, 2015.

*Primary Examiner* — Anthony Stashick
*Assistant Examiner* — Raven Collins
(74) *Attorney, Agent, or Firm* — Caesar Rivise, PC

(57) ABSTRACT

An insulated drinking vessel, e.g., a wine glass, and a method of making the same is disclosed. The vessel basically comprises a pre-molded outer vessel formed of a plastic material having a sidewall, a pre-molded ring formed of a plastic material, and an inner vessel having a sidewall. The ring includes a bottom end at which the vestige of a molding gate may be located. The inner vessel is formed of a plastic material molded in-situ on the bottom end of the ring to cause portions of the ring's plastic to melt and intermingle with the plastic material of the inner vessel to form a subassembly including a non-superficial homogenous joint between the ring and the inner vessel. The sidewall of the inner vessel of the subassembly is disposed within the sidewall of the outer vessel and the ring is welded to a top portion of the outer vessel to form the rim or lip of the insulated drinking vessel.

23 Claims, 2 Drawing Sheets

(51) Int. Cl.
*B29C 65/08* (2006.01)
*B29C 65/00* (2006.01)
*B29L 31/00* (2006.01)
*B29K 67/00* (2006.01)

(52) U.S. Cl.
CPC ... *B29C66/12461* (2013.01); *B29C 66/12463* (2013.01); *B29C 66/131* (2013.01); *B29C 66/30223* (2013.01); *B29C 66/545* (2013.01); *A47G 2400/10* (2013.01); *B29C 66/71* (2013.01); *B29C 66/8322* (2013.01); *B29K 2067/00* (2013.01); *B29L 2031/7132* (2013.01)

(56) References Cited

U.S. PATENT DOCUMENTS

| | | | |
|---|---|---|---|
| 4,550,849 A * | 11/1985 | Adsit | B29C 41/20 220/1.5 |
| 4,872,569 A | 10/1989 | Bolte | |
| 5,090,213 A | 2/1992 | Glassman | |
| 5,553,735 A * | 9/1996 | Kimura | A47G 19/2227 220/62.18 |
| 5,839,599 A | 11/1998 | Lin | |
| 6,050,443 A | 4/2000 | Tung | |
| 6,405,892 B1 | 6/2002 | Volan | |
| 6,419,108 B1 | 7/2002 | Toida et al. | |
| 6,921,179 B2 | 7/2005 | Ghanem | |
| D519,785 S | 5/2006 | Bodum | |
| D526,848 S | 8/2006 | Bodum | |
| D557,561 S | 12/2007 | Flowers et al. | |
| 7,306,113 B2 | 12/2007 | El-Saden et al. | |
| D693,176 S * | 11/2013 | Kaiser | D7/509 |
| 8,684,223 B1 | 4/2014 | Kalamaras | |
| 2003/0029876 A1* | 2/2003 | Giraud | A47G 19/2288 220/592.17 |
| 2004/0212120 A1 | 10/2004 | Giraud | |
| 2005/0045643 A1 | 3/2005 | Ghanem | |
| 2005/0173044 A1* | 8/2005 | Drummond | B01D 53/268 156/69 |
| 2005/0173365 A1 | 8/2005 | McKnight | |
| 2005/0194340 A1 | 9/2005 | Huang | |

* cited by examiner

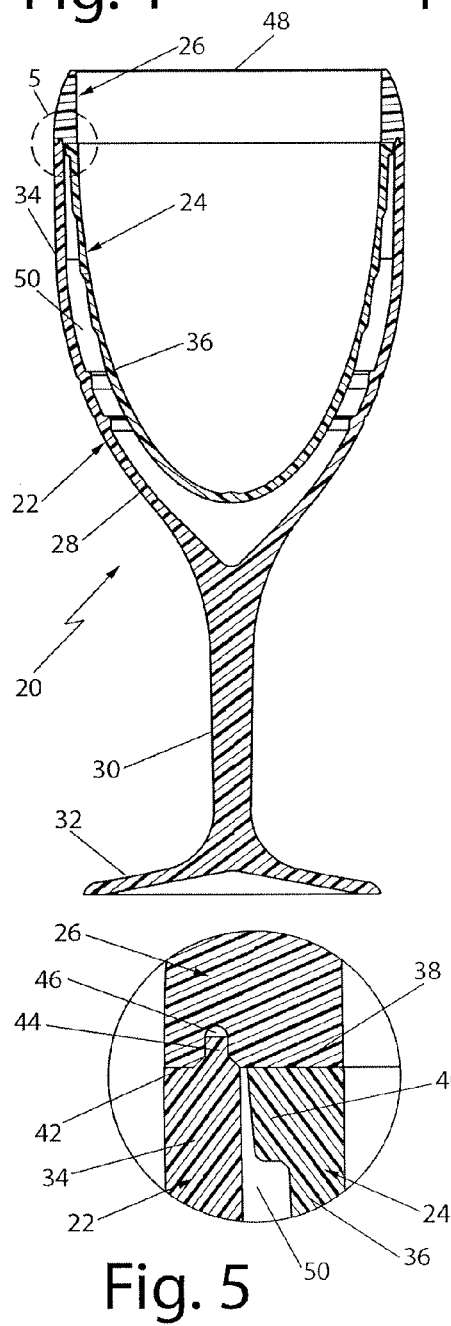
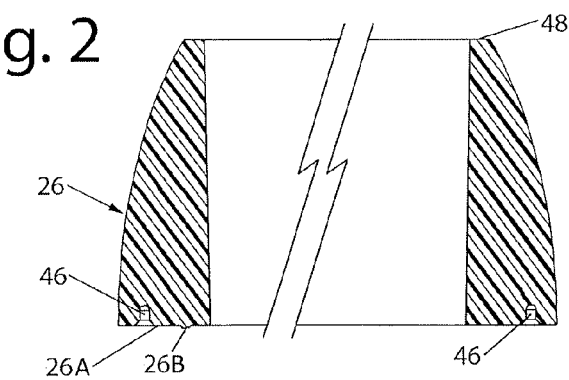
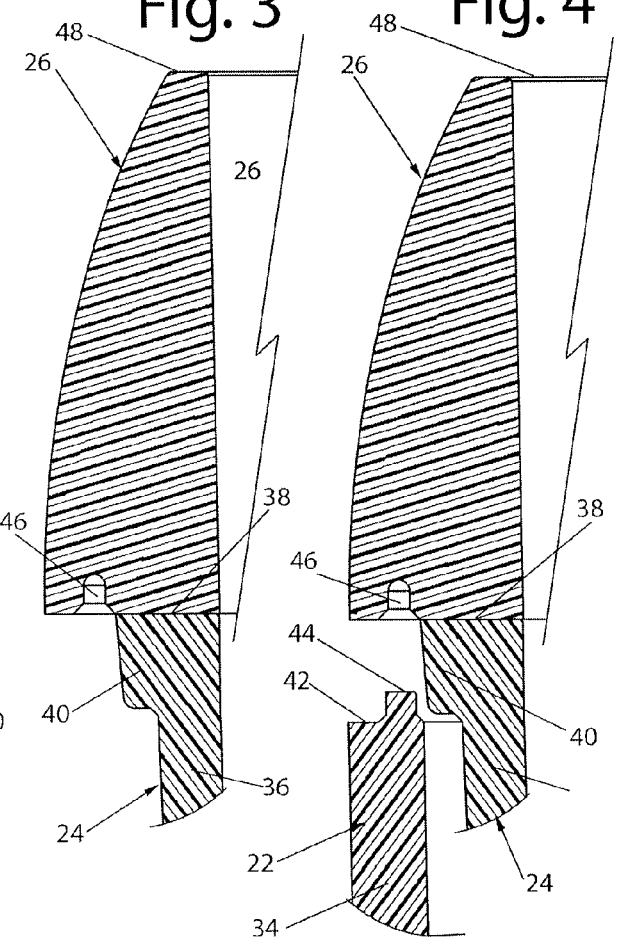

INSULATED DOUBLE WALLED DRINKING VESSEL AND METHOD OF MAKING THE SAME

CROSS-REFERENCE TO RELATED APPLICATIONS

This application is a continuation-in-part of U.S. application Ser. No. 14/694,363, filed on Apr. 23, 2015 entitled Insulated Doubled Walled Drinking Vessel And Method Of Making The Same, which in turn claims priority from U.S. Provisional Application No. 61/987,147 filed on May 1, 2014 entitled Insulated Doubled Walled Drinking Vessel And Method Of Making The Same. The entire disclosures of both such applications are incorporated by reference herein.

FIELD OF THE INVENTION

This invention relates generally to drinking vessels and more particularly to insulated drinking vessels having a thin rim and methods of making the same.

BACKGROUND OF THE INVENTION

Double walled insulated drinking vessels are commercially available from various vendors. There are also numerous U.S. Patents and published patent applications directed to doubled walled insulated drinking vessels, such as glasses, mugs, goblets, wine glasses and the like. See for example, U.S. Patents and published applications: U.S. Pat. No. 4,872,569 (Bolte); U.S. Pat. No. 5,090,213 (Glassman); U.S. Pat. No. 5,553,735 (Kimura); U.S. Pat. No. 5,839,599 (Lin); U.S. Pat. No. 6,050,443 (Tung et al.); U.S. Pat. No. 6,405,892 (Volan); U.S. Pat. No. 6,419,108 (Toida et al.); U.S. Pat. No. 6,921,179 (Ghanem); U.S. Pat. No. 7,306,113 (El-Saden et al.); D519,785 (Bodum); D526,848 (Bodum); D557,561 (Flowers et al.); 2004/0212120 (Giraud); 2005/0045643 (Ghanem); 2005/0173365 (McKnight); and 2005/0194340 (Huang).

While the insulated drinking vessels of the foregoing prior art may be generally suitable for their intended purposes, a need exists for drinking vessel which has a thin, but relatively long, drinking lip. The subject invention addresses that need by providing an insulated drinking vessel and method of making it. The drinking vessel is formed of an inner vessel, and outer vessel and a ring. The ring is pre-molded and has a bottom edge portion. The outer vessel is also pre-molded and has a top edge portion. The inner vessel is molded in-situ on the bottom end of the ring to form a non-superficial homogenous aesthetically pleasing joint therebetween. The top edge portion of the pre-molded outer vessel is fixedly secured to the bottom edge portion of the ring at a weld joint to complete the insulated drinking vessel and form an insulating space between the pre-molded vessel and the in-situ molded vessel.

SUMMARY OF THE INVENTION

In accordance with one aspect of this invention an insulated drinking vessel is provided. The insulated drinking vessel comprises an inner vessel, an outer vessel, and a ring. The inner vessel, the outer vessel and the ring each comprise a plastic material. The outer vessel and the ring are each a pre-molded component. The inner vessel has a top edge portion. The outer vessel has a top edge portion. The ring comprises a bottom edge portion which may include a vestige of a molding gate used to form the ring. The inner vessel is molded in-situ on the bottom edge portion of the pre-molded ring cause the plastic material thereof to fuse together and intermingle with the plastic material of the ring to form a non-superficial homogenous joint eliminating the visible appearance of the vestige. The top edge portion of the outer vessel is fixedly secured to the bottom edge portion of the ring at a weld joint. The ring forms the lip of the drinking vessel.

In accordance with one preferred aspect of this invention the weld joint comprises an annular projection located within an annular recess.

In accordance with one preferred aspect of this invention the ring is thin and relatively long, and may be optionally colored, while the inner and outer vessels are transparent. A decorative item may be located within the insulating air space.

Another aspect of this invention constitutes a method of making an insulated double walled drinking vessel comprising an inner vessel, an outer vessel and a ring. The method basically entails providing an outer vessel pre-molded of a plastic material and having a top edge portion. A ring pre-molded of a plastic material and having a bottom edge portion is also provided. The inner vessel is molded of a plastic material in-situ on the bottom edge portion of the ring to cause the plastic material thereof to fuse together and intermingle with the plastic material of the ring to form a non-superficial homogenous joint at a bottom edge portion of the ring.

If the ring includes any vestige of a gate used to mold the ring, the homogeneous joint resulting from the in-situ molding of the inner vessel on the ring eliminates the visible appearance of that vestige. Thus, another aspect of the method of this invention entails pre-molding the ring in a manner to ensure that any vestige of the molding gate used to mold the ring is located on the bottom edge portion of the ring.

DESCRIPTION OF THE DRAWING

FIG. 1 is vertical sectional view of one exemplary insulated drinking vessel, e.g., a wine glass, constructed in accordance with this invention;

FIG. 2 is an enlarged vertical sectional view of the ring component making up the top portion of the wine glass shown in FIG. 1;

FIG. 3 is a more enlarged sectional view of the top portion of the wine glass shown during one step in the making thereof pursuant to a method of this invention;

FIG. 4 is an enlarged sectional view, similar to FIG. 3, but showing the top portion of the wine glass at a further step in the method of making the wine glass;

FIG. 5 is an enlarged sectional view of the portion of the wine glass shown within the circle designated as 5 in FIG. 1.

DETAILED DESCRIPTION OF THE PREFERRED EMBODIMENT

Figure 6:
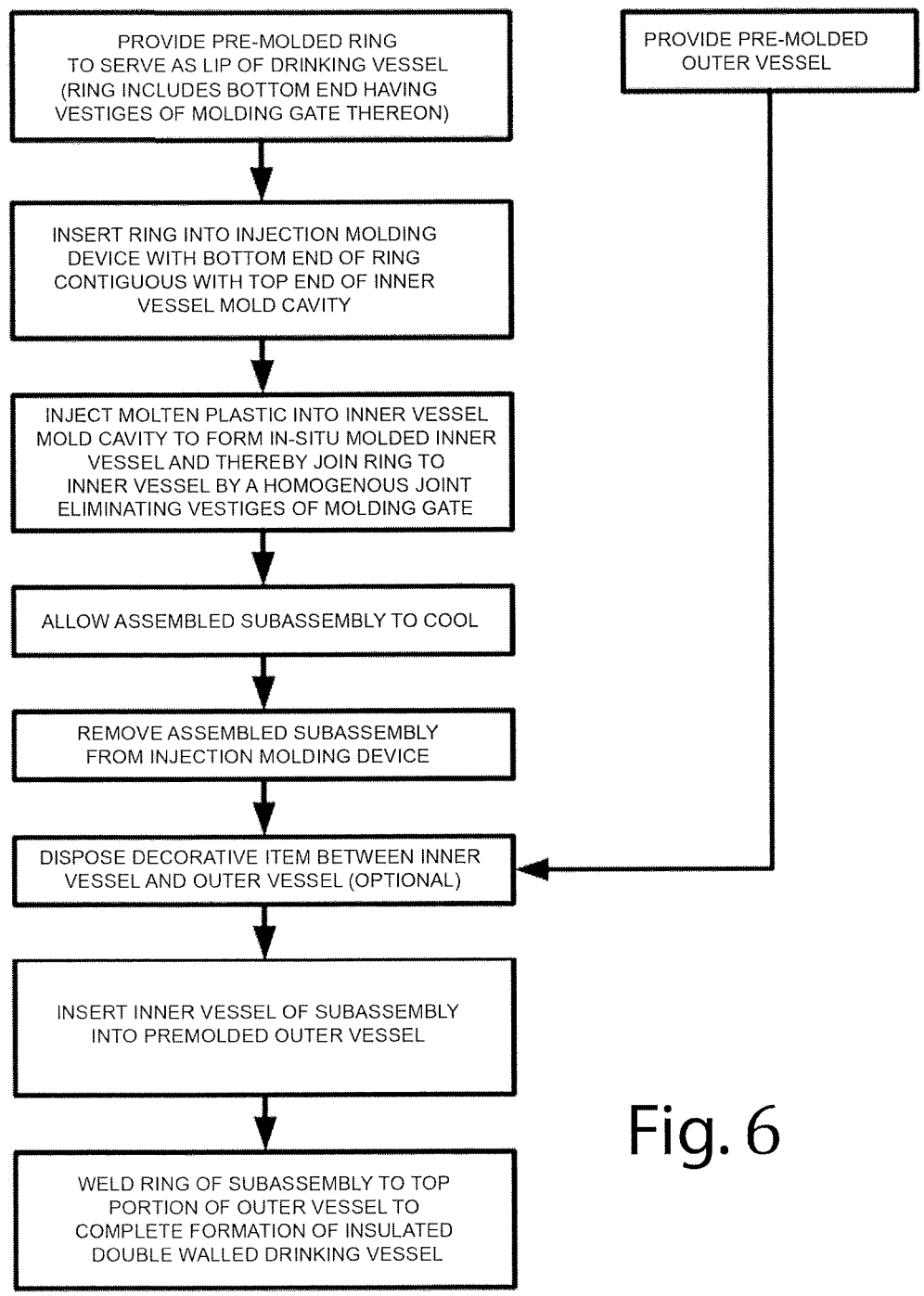
FIG. 6 is a block diagram of one exemplary method in accordance with this invention for making an insulated vessel, such as the wine shown in FIG. 1.

Referring now to the various figures of the drawing wherein like reference characters refer to like parts, there is shown at 20 in FIG. 1 one exemplary embodiment of an insulated drinking vessel, e.g., a stemmed wine glass, constructed in accordance with this invention. The wine glass 20 basically comprises an outer vessel 22, an inner vessel 24, and a ring 26. The outer vessel 22 is an integral unit that is pre-molded of any suitable transparent plastic material, e.g., Eastman Tritan™ copolyester sold by Eastman Chemical Company. By pre-molded it is meant that the component is made prior to its use in the assembly of the insulated vessel 20. The ring 26 is also a pre-molded component which forms the lip or rim of the wine glass 20 and includes a bottom surface 26A (FIG. 2). Any suitable conventional molding technique, e.g., blow molding, injection molding, etc., can be used to form the outer vessel and the ring, although injection molding is preferred. Unlike the outer vessel and the ring, the inner vessel is not a pre-molded component. Rather, as will be described in detail later, it is molded in-situ onto the bottom surface 26A of the ring 26 to form a subassembly, which is then welded to the outer vessel to complete the assembly of the wine glass 20.

As is known when a component is injection molded there will be some surface portion thereof formed by the gate of the mold. This surface portion will typically exhibit a somewhat dissimilar appearance from the surface of the component not at the location of the gate, thereby detracting from the aesthetics of the molded component. Thus, in the interest of aesthetics, it is a common practice of the prior art to treat the surface area at the location of the gate to provide the same appearance as the remainder of the molded component.

The subject invention entails a method of making the wine glass 20 which effectively eliminates any vestiges of a molding gate on the ring 26 without requiring a separate surface treatment. To that end, it is of importance from an aesthetic standpoint that if the pre-molded ring has any vestiges e.g., protrusions, etc., of the molding gate, such vestiges be located on the bottom end surface 26A of the ring. In the exemplary embodiment one such vestige 26B is shown.

As mentioned above the inner vessel is molded in-situ onto the ring in accordance with a method of this invention. That method will be described in detail later and is illustrated by the block diagram of FIG. 6. Suffice it for now to state that the pre-molded ring 26 is placed within an injection molding machine (not shown), with a portion of the bottom surface 26A of the ring 26 facing and contiguous with the top of a mold cavity that is shaped like the inner vessel 24. A molten plastic material, preferably the same material as that from which the ring was pre-molded, is injected under pressure into the mold cavity to fill the mold cavity and thereby form the inner vessel 24. Moreover, and quite significantly, the molten injected plastic forming the inner vessel 24 also engages the exposed bottom surface of the ring to cause that surface to melt and reflow to a substantial depth, e.g., within the range of approximately 0.003 inch-0.100 inch (preferably within the range of approximately 0.030 inch-0.080) inch, whereupon the injected plastic intermingles with the melted plastic of the ring, to form a non-superficial homogenous joint thereat, thereby integrally joining the ring 26 to the in-situ molded inner vessel 24. This non-superficial homogeneous joint eliminates any vestige 26B of the molding gate, thereby resulting in joint having an aesthetically pleasing appearance, e.g., the joint appears invisible.

Thus, in accordance with a preferred aspect of the method of this invention the pre-molding of the ring 26 is accomplished so that vestige(s) the gate of the mold in which the ring is made is(are) located at the bottom surface 26A of the ring. By pre-molding the ring so that the gate is located at the undersurface 26A of the ring, no surface treatment of the vestige 26B needs to be undertaken with the subject invention, since the molding of the inner vessel in-situ on the undersurface of the ring will completely eliminate or obscure the residual appearance of the gate, i.e., the plastic material at the location of the gate will become molten and intermingle with the plastic material forming the inner vessel, thereby eliminating any vestige of the gate.

The mold cavity for the in-situ molding of the inner vessel can be of any suitable thickness and height to form the inner vessel. For example, the inside diameter of the mold cavity which forms the inner vessel 24 is preferably chosen to be slightly larger than the inside diameter of the ring, whereupon during the in-situ molding operation when pressure is applied to the plastic forming the inner vessel, the inner surface of the inner vessel will be flush with the inner surface of the ring 26.

Once the inner vessel has been molded in-situ on the ring, the resulting subassembly or unit of the ring and the inner vessel is allowed to cool to the point that it can be removed from the mold cavity and inserted into the pre-molded outer vessel, so that the inner vessel of the subassembly is located in the bowl portion (to be described later) of the outer vessel, with a top edge portion of the outer vessel abutting a portion of the bottom surface or edge of the ring. That assembly can then be brought to a welding machine, e.g., an ultrasonic welding machine, to weld the ring with the inner vessel to the outer vessel.

The abutting surfaces of the ring and outer vessel at which an ultrasonically welded joint is to be formed are preferably profiled or shaped in such a manner to concentrate the ultrasonic energy thereat to facilitate the formation of a good weld joint. Thus, the abutting surfaces of the ring and outer vessel preferably make use of a conventional interference (e.g., double shear) joint. Alternatively, those surfaces may make use of a triangular protrusion energy director (e.g., an upstanding triangular annular protrusion from one flange surface and an planar surface on the other flange) or any other conventional joints or profiling that are known to those skilled in the art of ultrasonic welding, to create a good ultrasonic weld joint. In the exemplary embodiment shown and which will be described later, the abutting surfaces are in the form of a double shear, e.g., tongue and groove, joint.

Once the assembly of the outer vessel and the ring with its attached inner vessel is located in the ultrasonic welding machine, its horn or sonotrode can be applied to the top edge of the ring to produce a far field weld at the interface of the ring and the outer vessel, thereby completing the vessel 20. The resulting vessel exhibits the same properties as if it had been molded as an integral unit at one time, e.g., it exhibits the same resistance to breakage or other damage at the location of the joints between the ring and the inner and outer vessels as remainder of the unit.

The details of the exemplary wine glass 20 will now be described. Thus, as best seen in FIG. 1, the outer vessel includes a bowl shaped portion 28, a stem 30 and a flanged base 32. The bowl shaped portion 28 has a sidewall 34 that is a surface of revolution and can be of any desired shape. In the exemplary embodiment it is shown as being arcuate. The inner vessel 24 is generally bowl shaped and includes an arcuate sidewall 36. The sidewall 36 is also a surface of revolution and can be of any desired shape. In the exemplary embodiment it is also arcuate. As best seen in FIGS. 2-4, the upper end of the sidewall 36 is in the form of an outwardly directed annular flange 40.

As mentioned above the abutting surfaces of the ring and outer vessel at which the ultrasonic joint is to be formed are preferably in the form of a double shear, e.g., tongue and groove, interference joint. To that end, as best seen in FIGS.

3 and 4, the top edge or upper surface 42 of the sidewall 34 of the outer vessel 22 includes an annular wall 44 projecting upward therefrom. The annular wall 44 is chamfered at the point where it merges with the top surface 42 and forms the tongue of the tongue and groove joint. The height of the annular walls is preferably within the range of 0.025 inch to 0.050 inch (and most preferably 0.04 inch). The thickness of the annular wall is preferably within the range of 0.025 inch to 0.05 inch (and most preferably 0.040 inch). The annular wall or tongue 44 is arranged to be disposed within a correspondingly shaped groove to form the tongue and groove interference joint. That groove is in the form of an annular recess 46 located in the portion 42 of the planar bottom surface 26A of the ring 26. The annular recess 46 is correspondingly shaped to the annular wall 44 and includes a chamfered entryway contiguous with the undersurface portion 42.

While not preferable, the tongue and groove interference joint can alternatively be formed by having the annular groove 46 in the top edge of the outer vessel 22 and the annular wall 44 project downward from the undersurface portion 42 of the ring 26. In fact, as mentioned above the abutting surfaces of the ring and the outer vessel may include other features or profiles to concentrate the ultrasonic welding energy thereat in lieu of the exemplary tongue and groove joint.

The welding of the ring to the outer vessel is accomplished by placing the horn or sonotrode of an ultrasonic welding device onto the top surface 48 of the ring 26 to focus and direct the ultrasonic energy to the engaging surfaces of the annular wall 44 and annular recess 46. Since the ring has a height of up to approximately 1 inch the weld produced is constitutes what could be called a "far-field" weld. During the welding operation, the annular wall 44 melts and flows into the annular recess 46 to form a strong welded joint therebetween, like shown in FIG. 5.

When the ring 26 with the inner vessel 24 is welded to the outer vessel as just described the outer surface of the sidewall 36 of the inner vessel 24 is spaced from the inner surface of the sidewall 34 of the outer vessel 22 to form an insulating air space 50 therebetween. If desired, an optional, decorative item, e.g., a wrap, an embroidered emblem or patch, etc., (not shown) can be disposed in the air space prior to the welding of the components to provide enhanced aesthetics for the vessel 20. Irrespective of the construction of the decorative item, since it is disposed within the air space 50 and the sidewall of the outer vessel 22 is transparent, it will be visible through the transparent sidewall to provide enhanced aesthetics to the insulated vessel 20. Moreover, in the interest of aesthetics, the material forming the ring 26 may be colored to accentuate the rim and to coordinate with the ornamentation provided by the decorative item with in the insulated air space. For example, the decorative item within the air space may be a wrap or embroidered patch bearing a college logo in the college's colors, with the ring being colored to match one of the college's colors for emphasis.

If the insulated vessel is something other than a wine glass, e.g., is a bottle, a helical thread may be provided on the outer surface of the ring 26 to accommodate a threaded cap or lid for the insulated vessel. To that end, the mold cavity in which the ring is pre-molded may include helical thread forming portion contiguous with the portion of the cavity forming the outer surface of the ring. Alternatively, the ring may be formed with an internal helical thread for a cap or lid. In such a case, the mold cavity may include helical thread forming portion contiguous with the portion of the cavity forming the inner surface of the ring. Other features can be molded into the ring during its formation, e.g., the top edge of the ring may include a portion of elevated height to form an enlarged lip for facilitating the drinking of a beverage from the vessel. A straw holder, not shown, may also be formed in the ring as the ring is molded.

As mentioned above the method of making the insulated wine glass 20 (or any other double walled insulated drinking vessel constructed in accordance with this invention) constitutes another aspect of this invention. To that end, as best seen in FIG. 6, the method entails providing a pre-molded ring formed of a plastic material. That ring is constructed as discussed earlier. The ring is inserted into the injection molding machine so that it is at the top of the injection molding machine's cavity for forming the inner vessel with its bottom surface 26A contiguous with the portion of the mold cavity for forming the inner vessel. The geometry of the molding machine cavity is such that a leak proof seal is created inside the cavity when the mold is closed. This is accomplished by making the portion of the cavity that the ring is nested in of a smaller diameter by at least 0.004 inch than the inner diameter of the portion of the cavity forming the inner surface of the inner vessel. Moreover, it is desirable to have the mold cavity produce a land length of at least 0.060 inch.

The inner vessel is then molded in-situ on the bottom edge portion of the pre-molded ring, whereupon the heat and pressure applied causes the plastic material forming the inner vessel to fuse together and intermingle with the re-flow (melted) plastic material of the ring to form a non-superficial homogenous joint and with the inner vessel having an inner surface that is flush with the inner surface of the ring vessel. Moreover, the gating of the inner vessel should be placed in such a way as to give maximum heat to the re-flow area. Thus, it is preferably located as close to the inner re-flow area as possible. The parameters of the injection molding process are set in a way to create enough shear heat to re-flow the top surface of the inner vessel to form the non-superficial homogeneous joint. For example, in accordance with one exemplary process of this invention, barrel heats are set to a range between 530-560 degrees F. and pack and hold cavity pressures are between approximately 10,000 PSI to 12,000 PSI.

After the in-situ molding process is complete, the assembled unit or subassembly of the ring and inner vessel is allowed to cool within the injection molding machine until the molten plastic has solidified sufficiently that the subassembly can be removed to be welded to the outer vessel. To that end, the inner vessel 24 of the subassembly is placed within the interior of the bowl shaped portion 28 of the outer vessel, such that the annular wall 44 of the outer vessel is juxtaposed opposite the annular groove 46 in the undersurface 42 of the ring 26 as shown in FIG. 4. Those surfaces can then be brought into abutment with each other with the sonotrode of the ultrasonic welding machine engaging the top free edge or surface 48 of the ring 26 to apply pressure thereto and to focus and direct ultrasonic energy therefrom through the height of the ring to the engaging surfaces of the annular wall 44 and annular recess 46, to cause those surface to melt and fuse to form a good joint like shown in FIG. 5. That action completes the vessel 20. Another vessel can then be made in a similar manner as just described.

It should be pointed out at this juncture that the structure of the insulated drinking vessel and method or making it as described above are merely exemplary of various structures and methods that are contemplated by this invention. Thus, for example, the insulated vessel 20 of this invention is not limited to wine glasses, but may be in the form of mugs, tumblers, bottles, etc. Moreover, the sidewall portions of the vessels may be of other shapes and sizes than that shown in the drawing. What is important is that the upper rim of the vessel is formed by a pre-mold ring and that the inner vessel is molded in-situ on the pre-molded ring to produce a thin upper lip or rim formed of a single sidewall, while a substantial portion of the remainder of the insulated vessel below the ring is insulated via a double wall construction.

Without further elaboration the foregoing will so fully illustrate our invention that others may, by applying current or future knowledge, adopt the same for use under various conditions of service.

We claim:

1. An insulated drinking vessel comprising:
   an outer vessel comprising a separate pre-molded component formed of a plastic material and having a top edge portion;
   a ring forming the lip of said drinking vessel and comprising a separate pre-molded component formed of a plastic material and having a bottom edge portion which may include a vestige of a molding gate used to form said ring; and
   an inner vessel comprising a plastic material that is molded in-situ on said bottom edge portion of said ring to cause the plastic material of said inner vessel to fuse together and intermingle with said plastic material of said ring to form a non-superficial homogenous joint, said non-superficial homogenous joint eliminating the visible appearance of said vestige if said ring had included said vestige, said top edge portion of said outer vessel being fixedly secured to said bottom edge portion of said ring by a welded joint.

2. The insulated drinking vessel of claim 1 wherein said plastic material of said inner vessel, said outer vessel and said ring is the same plastic material.

3. The insulated drinking vessel of claim 2 wherein said plastic material comprises copolyester.

4. An insulated drinking vessel comprising:
   an outer vessel comprising a separate pre-molded component formed of a plastic material and having a top edge portion;
   a ring forming the lip of said drinking vessel and comprising a separate pre-molded component formed of a plastic material and having a bottom edge portion which may include a vestige of a molding gate used to form said ring; and
   an inner vessel comprising a plastic material that is molded in-situ on said bottom edge portion of said ring to cause the plastic material of said inner vessel to fuse together and intermingle with said plastic material of said ring to form a non-superficial homogenous joint, said non-superficial homogenous joint eliminating the visible appearance of said vestige if said ring had included said vestige, said top edge portion of said outer vessel being fixedly secured to said bottom edge portion of said ring by a welded joint, said welded joint comprising an annular projection located within an annular recess.

5. The insulated drinking vessel of claim 1 wherein said inner vessel, said outer vessel and said ring are transparent.

6. An insulated drinking vessel comprising:
   an outer vessel comprising a separate pre-molded component formed of a plastic material and having a top edge portion;
   a ring forming the lip of said drinking vessel and comprising a separate pre-molded component formed of a plastic material and having a bottom edge portion which may include a vestige of a molding gate used to form said ring; and
   an inner vessel comprising a plastic material that is molded in-situ on said bottom edge portion of said ring to cause the plastic material of said inner vessel to fuse together and intermingle with said plastic material of said ring to form a non-superficial homogenous joint, said non-superficial homogenous joint eliminating the visible appearance of said vestige if said ring had included said vestige, said top edge portion of said outer vessel being fixedly secured to said bottom edge portion of said ring by a welded joint, wherein said inner vessel and said outer vessel are transparent and wherein said ring is colored.

7. The insulated drinking vessel of claim 1 wherein said inner vessel includes a sidewall and wherein said outer vessel comprises a sidewall, and wherein portions of said sidewall of said inner vessel are spaced from portions of said sidewall of said outer vessel to form an insulating air space therebetween.

8. The insulating drinking vessel of claim 1 wherein said welded joint comprises a far-field ultrasonically welded joint.

9. The insulating drinking vessel of claim 5 wherein said welded joint comprises a far-field ultrasonically welded joint.

10. A method for making an insulated drinking vessel comprising:
    a) providing an outer vessel pre-molded of a plastic material and having a top edge portion;
    b) providing a ring pre-molded of a plastic material and having a bottom edge portion;
    c) molding an inner vessel of a plastic material in-situ on said bottom edge portion of said ring to cause the plastic material thereof to fuse together and intermingle with said plastic material of said ring to form a non-superficial homogenous joint at a bottom edge portion of said ring; and
    c) fixedly securing said top edge portion of said outer vessel to a bottom edge portion of said ring by a weld joint.

11. The method of claim 10 wherein said bottom edge portion of said ring includes a vestige of a molding gate used to form said ring and wherein the formation of said homogenous joint eliminates the visible appearance of said vestige.

12. The method of claim 11 wherein said method comprises molding said ring in a manner to ensure that any vestige of the molding gate used to mold said ring is located on the bottom edge portion of said ring.

13. The method of claim 11 wherein said plastic material of said inner vessel, said outer vessel and said ring is the same plastic material.

14. The method of claim 13 wherein said plastic material comprises copolyester.

15. The method of claim 11 wherein said weld joint comprises an annular projection located within an annular recess.

16. The method of claim 11 wherein said inner vessel, said outer vessel and said ring are transparent.

17. The method of claim 11 wherein said inner vessel and said outer vessel are transparent and wherein said ring is colored.

18. The method of claim 11 wherein said inner vessel includes a sidewall and wherein said outer vessel comprises a sidewall, and wherein portions of said sidewall of said inner vessel are spaced from portions of said sidewall of said outer vessel to form an insulating air space therebetween when said inner vessel is disposed within said outer vessel.

19. The method of claim 18 additionally comprising disposing a decorative item within said insulating air space.

20. The method of claim 11 wherein said weld joint comprises a far-field ultrasonically welded joint.

21. The insulated drinking vessel of claim 1 wherein said inner vessel and said outer vessel are transparent and wherein said ring is colored.

22. The insulating drinking vessel of claim 4 wherein said welded joint comprises a far-field ultrasonically welded joint.

23. The insulated drinking vessel of claim 4 wherein said inner vessel, said outer vessel and said ring are transparent.

\* \* \* \* \*